(12) United States Patent
Freund et al.

(10) Patent No.: US 7,368,718 B2
(45) Date of Patent: May 6, 2008

(54) X-RAY DETECTOR

(75) Inventors: Andreas Freund, Heroldsbach (DE); Juergen Leppert, Forchheim (DE); Michael Miess, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 35 days.

(21) Appl. No.: 11/312,562

(22) Filed: Dec. 21, 2005

(65) Prior Publication Data

US 2006/0131503 A1    Jun. 22, 2006

(30) Foreign Application Priority Data

Dec. 22, 2004   (DE)   ............. 10 2004 061 867

(51) Int. Cl.
*G01T 1/20* (2006.01)
(52) U.S. Cl. .................................. 250/361 R
(58) Field of Classification Search ............. 250/361 R
See application file for complete search history.

(56) References Cited

U.S. PATENT DOCUMENTS 5,910,522 A * 6/1999 Schmidt et al. ............. 523/168
6,194,481 B1   2/2001 Furman et al.
2002/0079455 A1 * 6/2002 Wieczorek ................ 250/367
2003/0062481 A1 * 4/2003 Okada et al. .......... 250/361 R
2003/0092790 A1   5/2003 Yamaguchi
2004/0197067 A1  10/2004 Kumagai

FOREIGN PATENT DOCUMENTS

JP        2003073563 A      3/2003

OTHER PUBLICATIONS

"Ordinary and extraordinary complex refractive index of the lead tungstate (PbWO4) crystal," Baccaro, S. et al.Nuclear Instruments and Methods in Physics Research Section A, v. 385, p. 209-214. Publication Date: Jan 1997.*

* cited by examiner

*Primary Examiner*—David Porta
*Assistant Examiner*—Jessica L Eley
(74) *Attorney, Agent, or Firm*—Harness, Dickey & Pierce, P.L.C.

(57) ABSTRACT

An x-ray detector with a scintillator element connected to a detection area of a photodiode via an optically transparently curing adhesive. To increase the sensitivity of the x-ray detector, it is proposed to mix the adhesive with a powder prepared from a material with a refractive index of at least 1.8 and an average grain size of less than 100 nm.

35 Claims, 1 Drawing Sheet

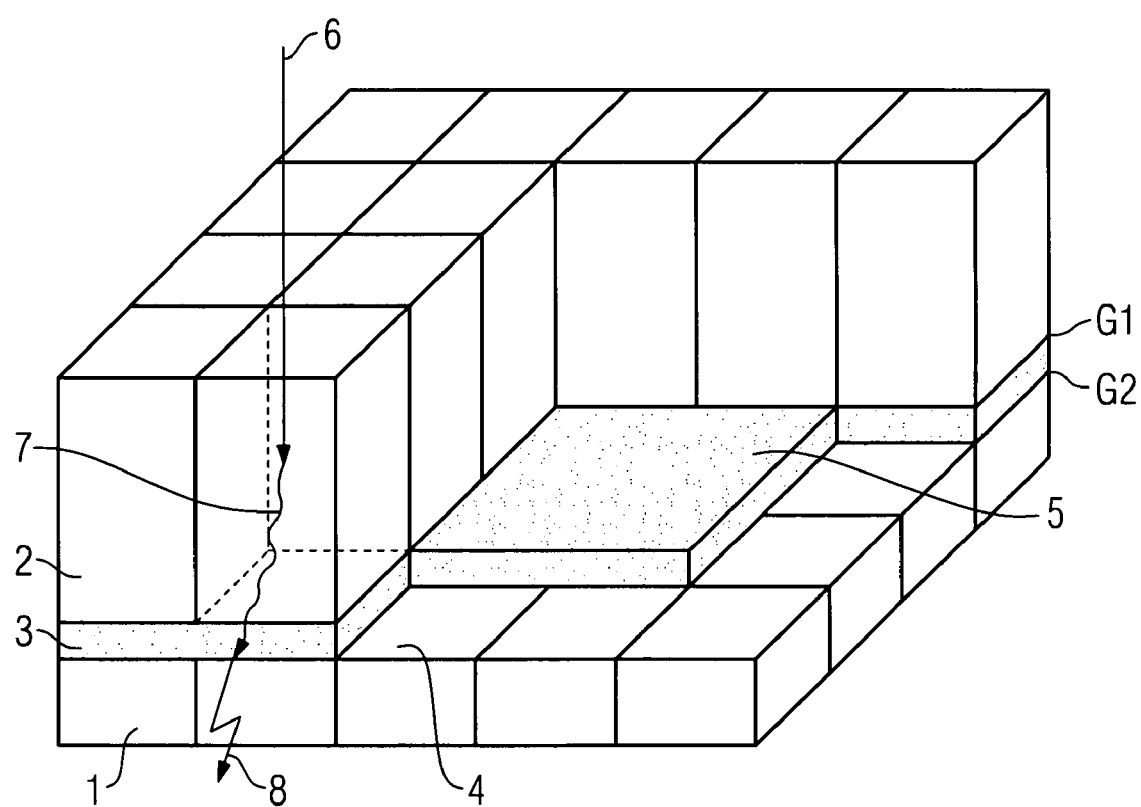

X-RAY DETECTOR

The present application hereby claims priority under 35 U.S.C. §119 on German patent application number DE 10 2004 061 867.4 filed Dec. 22, 2004, the entire contents of which is hereby incorporated herein by reference.

FIELD

The invention generally relates to an x-ray detector, the use of a transparently curing adhesive for an x-ray detector, and/or a method for producing the x-ray detector.

BACKGROUND

There are known x-ray detectors, for example directly converting x-ray detectors, in which a scintillator element is adhesively attached to a detection area of a photodiode by way of an optically transparent adhesive, for example an epoxy resin. An intensity of a scintillation light produced in the scintillator element is attenuated when the adhesive is penetrated. This detracts from the sensitivity of the x-ray detector.

SUMMARY

An object of at least one embodiment of the invention is to reduce or even eliminate at least one of the disadvantages of the prior art. It is intended in particular, in at least one example embodiment, to provide an x-ray detector which makes it possible for a high amount of light to be coupled out from a scintillator element. Furthermore, it is intended, in at least one example embodiment, to provide an x-ray detector with improved sensitivity. A further object of at least one example embodiment of the invention is to provide a use for a transparently curing adhesive and a method for producing an x-ray detector with improved sensitivity.

At least one embodiment of the invention provides an x-ray detector in which a scintillator element is connected to a detection area of a photodiode via an optically transparently curing adhesive, a powder which is prepared from a material with a refractive index of at least 1.8 and the average grain size of which is less than 100 nm being added to the adhesive as a filler. The adhesive may be especially well suited for the adhesive bonding of scintillator elements and photodiodes with high refractive indices, for example of 1.8 and more. The refractive index of the adhesive can be changed and adapted by the proportion of powder in the adhesive. Adapting the refractive indices allows the optical transitions at the interfaces between the adhesive and the scintillator elements and detection areas of the photodiodes to be substantially improved. A loss of intensity of the scintillation light produced in the scintillator element when it passes through the interfaces can be significantly reduced.

The proposed grain size is generally less than a wavelength of the scintillation light. In this way, scattering of the scintillation light at the powder particles and an associated loss of intensity are largely avoided. The adhesive preferably has a layer thickness of 20 μm to 100 μm, preferably 20 μm to 50 μm.

According to a refinement of at least one embodiment of the invention, it is provided that the average grain size is less than 50 nm, preferably less than 30 nm. With such grain sizes, the scattering of the scintillation light possibly caused by the powder particles can be further reduced.

According to a further refinement of at least one embodiment of the invention, it is provided that the refractive index is greater than 2.1, preferably greater than 2.7.

Materials with such refractive indices are especially well suited for adapting the refractive index of the adhesive to the refractive indices of the scintillator elements and photodiodes, which are for example above 1.8 or 2. The concentration of the powder in the adhesive is preferably between 1% by volume and 40% by volume.

According to an especially advantageous refinement of at least one embodiment of the invention, the material is prepared from a metal oxide, preferably from $TiO_2$ or $ZrO_2$. Such materials are transparent and have high refractive indices of approximately 2.7 and 2.1, respectively. Optically transparently curing, highly refractive adhesives can be prepared for adhesively bonding the scintillator elements to the detection areas. The adhesive is preferably selected from the following group: resin adhesive, epoxy resin adhesive, hotmelt adhesive, UV-curing adhesive, acrylate adhesive.

In the case of the proposed x-ray detector, the composition of the adhesive may be chosen such that its refractive index is especially well adapted to the refractive indices of the scintillator elements and the photodiodes. The loss of intensity of the scintillation light produced in the scintillator element can be significantly reduced. Absorption and scattering of the scintillation light can be significantly reduced. The scintillation light can be coupled out from the scintillator element especially efficiently and with especially low loss of intensity. The sensitivity of the x-ray detector can be improved.

At least one embodiment of the invention further provides an optically transparently curing adhesive to which there is added as a filler a powder which is prepared from a material with a refractive index of at least 1.8 and the average grain size of which is less than 100 nm, to use for connecting a scintillator element of an x-ray detector to a detection area of a photodiode of the x-ray detector.

At least one embodiment of the invention further provides a method for producing an x-ray detector with the following steps:

preparing an optically transparently curing adhesive, to which a powder which is prepared from a material with a refractive index of at least 1.8 and has an average grain size of less than 100 nm is added as a filler, and producing an adhesive connection between a detection area of a photodiode and a scintillator element.

With respect to the advantageous uses and advantageous refinements of the method, reference is made to the statements made above concerning the advantageous refinements of the x-ray detector. The advantages of the use according to at least one embodiment of the invention and of the method according to the invention arise directly from the advantages of the x-ray detector according to at least one embodiment of the invention.

To prepare the adhesive, an epoxy resin with a refractive index of between 1.4 and 1.6 may be used for example. After adding the powder, for example $TiO_2$ or $ZrO_2$ powder, to the epoxy resin, a homogeneous dispersion of epoxy resin and powder is prepared. In this case, the proportion of the powder in the dispersion may be 1 to 40% by volume, preferably 5 to 35% by volume. After curing, the adhesive has outstanding transparency.

The refractive index of the adhesive can be adapted to the refractive index of a highly. refractive material. For example, the refractive index of epoxy resin of approximately 1.5 can be increased by adding $TiO_2$ or $ZrO_2$ powder with refractive indices of 2.7 and 2.1, respectively. The refractive index of the adhesive can be adapted for example to refractive indices above the value of 2 of the scintillator elements and photodiodes of an x-ray detector.

The scintillator elements may be, for example, ceramic scintillator elements, which are produced on the basis of gadolinium oxisulfide. In order to reduce the scattering of the scintillation light by the powder, it is advantageous to choose a grain size which is less than the wavelength of the scintillation light. The grain size of the powder is preferably less than 100 nm, especially preferably less than 50 nm, in particular preferably less than 30 nm.

BRIEF DESCRIPTION OF THE DRAWINGS

At least one example embodiment of the invention is explained in more detail below on the basis of the single FIGURE.

The FIGURE schematically shows an x-ray detector according to at least one example embodiment of the invention.

DETAILED DESCRIPTION OF THE EXAMPLE EMBODIMENTS

The x-ray detector of at least one example embodiment has a multiplicity of photodiodes 1 and scintillator elements 2 arranged in a checkerboard fashion. Each scintillator element 2 is connected to a detection area 4 of the photodiode 1 by means of an adhesive 3. The adhesive 3 is mixed with a powder 5. The reference numeral 6 designates an x-ray beam falling on the scintillator element 2. The reference numerals 7 and 8 designate the scintillation light produced in the scintillator element 2 and an electric signal generated by the photodiode 1. A first interface, lying between the scintillator element 2 and the adhesive 3, is designated by the reference numeral G1. A second interface, lying between the photodiode 1 and the adhesive 3, is designated by the reference numeral G2.

For reasons of clarity, not all the scintillator elements 2 are shown and not all the detection areas 4 of the photodiodes 1 are covered with the adhesive 3.

The function of the x-ray detector is as follows:

The x-ray beam 6 impinging on the scintillator element 2 produces the scintillation light 7 in the scintillator element 2. The scintillation light 7 propagates in the scintillator element 2 in the direction of the photodiode 1. At the first interface G1, the scintillation light 7 passes from the scintillator element 2 into the adhesive 3. After penetrating the adhesive 3, which is approximately 50 μm to 70 μm thick, the scintillation light 7 leaves the adhesive 3 at the second interface G2 and impinges on the detection area 4 of the photodiode 1. The photodiode 1 senses the scintillation light 7 and generates the electric signal 8, corresponding to the intensity of the scintillation light 7 impinging on the detection area.

The refractive index of the adhesive 3 is adapted to the refractive indices of the scintillator element 2 and the photodiode 1. For example, the adhesive may be an epoxy resin mixed with $TiO_2$ or $ZrO_2$ powder. On account of the adaptation of the refractive indices, the optical transitions at the first interface G1 and the second interface G2 are especially good. At the first interface G1 and the second interface G2, as little of the scintillation light 7 as possible is reflected. The loss of intensity by reflection can be significantly reduced in comparison with non-adapted adhesives. Furthermore, the maximum possible angle of emergence of the scintillation light 7 from the scintillator element 2 is greater than in the case of a conventional adhesive 3.

The scintillation light 7 can be coupled out more effectively from the scintillator element 2. The average time the scintillation light 7 remains in the scintillator element 2 can be reduced. Absorption and loss of intensity of the scintillation light 7 as a result of multiple reflections in the scintillation element 2 can be significantly reduced.

If the wavelength of the scintillation light 7 is greater than the grain size, a loss of intensity caused by scattering of the scintillation light 7 in the adhesive 3 can be minimized. For example, with a grain size of less than 100 nm, it is possible to counteract the scattering of scintillation light 7 of a CsJ crystal with a wavelength of 400 nm. If still smaller grain sizes are used, for example less than 50 nm or less than 30 nm, the loss of intensity by scattering can be further reduced.

The adhesive 3 can achieve the effect that the loss of intensity of the scintillation light 7 is as small as possible. Weak signals can be sensed with high accuracy and small losses of intensity can be resolved. An x-ray detector with an especially high sensitivity can be produced.

Example embodiments being thus described, it will be obvious that the same may be varied in many ways. Such variations are not to be regarded as a departure from the spirit and scope of the present invention, and all such modifications as would be obvious to one skilled in the art are intended

What is claimed is:

1. An x-ray detector, comprising:
a scintillator element, connected to a detection area of a photodiode via a separate optically transparently curing adhesive, a powder being prepared from a material with a refractive index of at least 1.8 and the average grain size of which is less than 100 nm being added to the adhesive as a filler.

2. The x-ray detector as claimed in claim 1, the adhesive having a layer thickness of 20 μm to 100 μm.

3. The x-ray detector as claimed in claim 1, the average grain size being less than 50 nm.

4. The x-ray detector as claimed in claim 1, the refractive index being greater than 2.1.

5. The x-ray detector as claimed in claim 1, the powder in the adhesive having a concentration of between 1% by volume and 40% by volume.

6. The x-ray detector as claimed in claim 1, the material being prepared from a metal oxide.

7. The x-ray detector as claimed in claim 1, the adhesive being selected from the following group: resin adhesive, epoxy resin adhesive, hotmelt adhesive, UV-curing adhesive, and acrylate adhesive.

8. The x-ray detector as claimed in claim 1, the adhesive having a layer thickness of 20 μm to 50 μm.

9. The x-ray detector as claimed in claim 1, the average grain size being less than 30 nm.

10. The x-ray detector as claimed in claim 1, the refractive index being greater than 2.7.

11. The x-ray detector as claimed in claim 1, the material being prepared from at least one of TiO2 and ZrO2.

12. The x-ray detector of claim 1, wherein the scintillator element is a cuboud scintillator element.

13. The x-ray detector of claim 1, wherein the scintillator element is a one piece scintillator element.

14. The x-ray detector of claim 1, wherein the scintillator element is ceramic or CsJ-crystal.

15. A method, comprising:
connecting a scintillator element of an x-ray detector to a detection area of a photodiode of the x-ray detector using a separate optically transparently curing adhesive, to which there is added as a filler a powder prepared from a material with a refractive index of at least 1.8 and the average grain size of which is less than 100 nm.

16. The method as claimed in claim 15, the average grain size being less than 50 nm.

17. The method as claimed in claim 15, the refractive index being greater than 2.1.

18. The method as claimed in claim 15, the powder in the adhesive having a concentration of between 1% by volume and 40% by volume. oxide.

19. The method as claimed in claim 15, the material being prepared from a metal oxide.

20. The method as claimed in claim 15, the adhesive being selected from the following group: resin adhesive, epoxy resin adhesive, hotmelt adhesive, UV-curing adhesive, and acrylate adhesive.

21. The method as claimed in claim 15, the adhesive having a layer thickness of 20 µm to 50 µm.

22. The method as claimed in claim 15, the average grain size being less than 30 nm.

23. The method as claimed in claim 15, the refractive index being greater than 2.7.

24. The method as claimed in claim 15, the material being prepared from at least one of TiO2 and ZrO2.

25. A method for producing an x-ray detector, comprising:
preparing an optically transparently curing adhesive, to which a powder prepared from a material with a refractive index of at least 1.8 and having an average grain size of less than 100 nm, is added as a filler; and
producing an adhesive connection between a detection area of a photodiode and a scintillator element, the optically transparently curing adhesive being separate from the photodiode and the scintillator element.

26. The method as claimed in claim 25, the adhesive having a layer thickness of 20 µm to 100 µm.

27. The method as claimed in claim 25, the average grain size being less than 50 nm.

28. The method as claimed in claim 25, the refractive index being greater than 2.1.

29. The method as claimed in claim 25, the powder in the adhesive having a concentration of between 1% by volume and 40% by volume. oxide.

30. The method as claimed in claim 25, the material being prepared from a metal oxide.

31. The method as claimed in claim 25, the adhesive being selected from the following group: resin adhesive, epoxy resin adhesive, hotmelt adhesive, UV-curing adhesive, and acrylate adhesive.

32. The method as claimed in claim 25, the adhesive having a layer thickness of 20 µm to 50 m.

33. The method as claimed in claim 25, the average grain size being less than 30 nm.

34. The method as claimed in claim 25, the refractive index being greater than 2.7.

35. The method as claimed in claim 25, the material being prepared from at least one of TiO2 and ZrO2.

* * * * *